Figure 5:
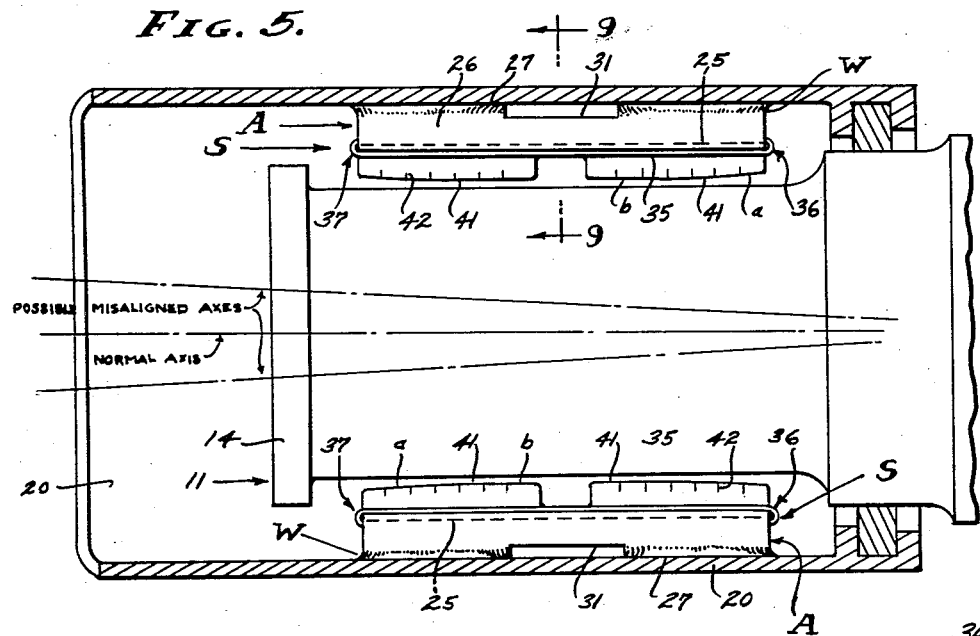

April 21, 1964     S. M. HOUSTON, JR     3,129,984
JOURNAL STOP AND ADAPTER THEREFOR
Filed June 16, 1961     2 Sheets-Sheet 1
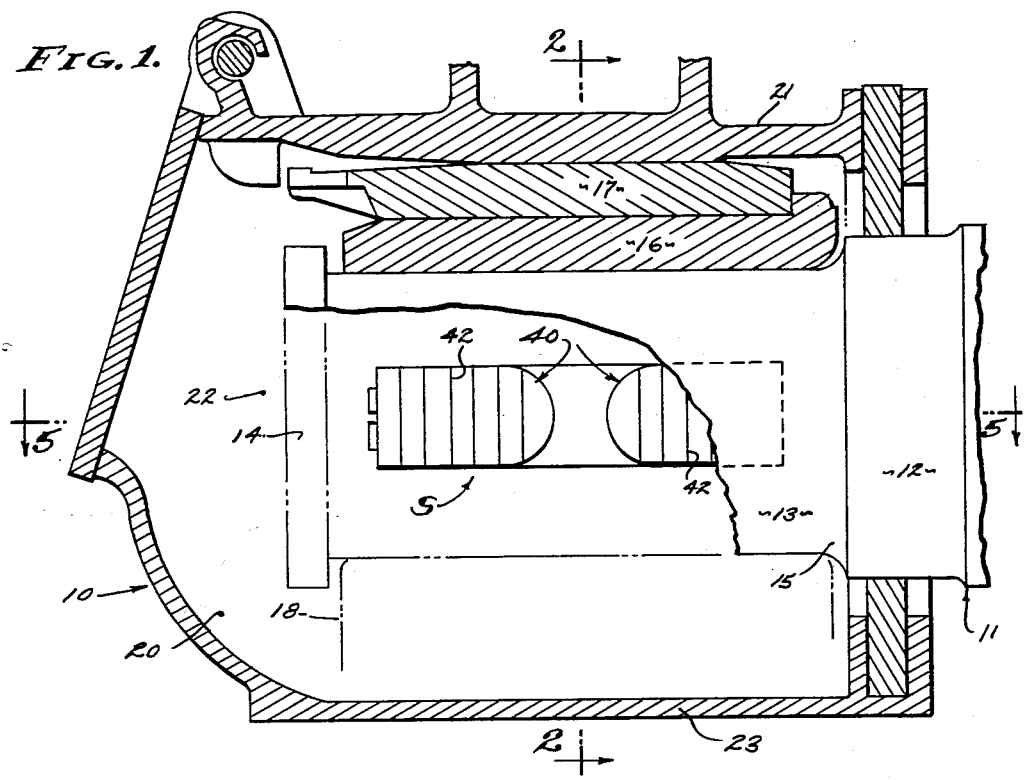
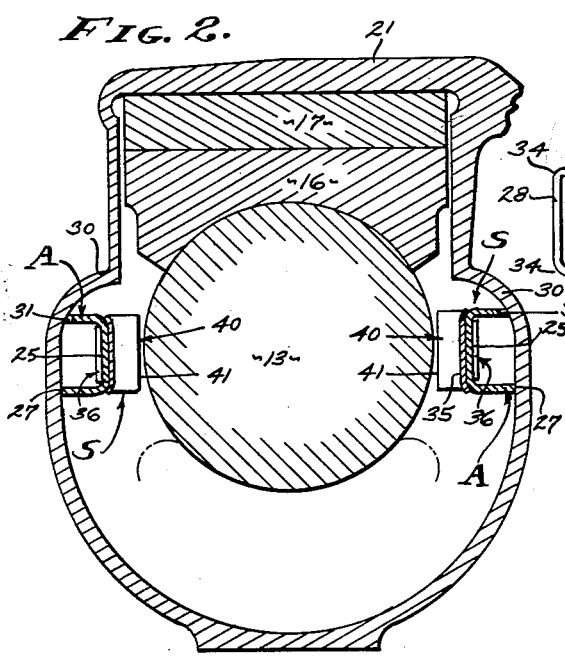
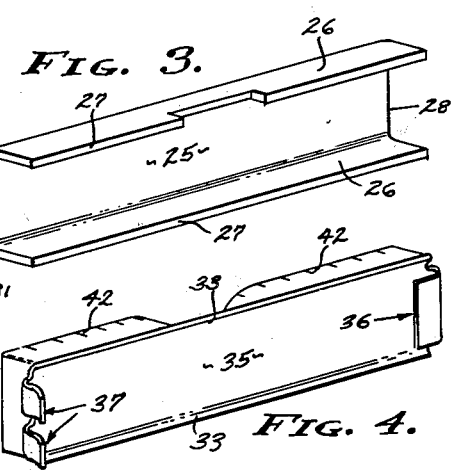
INVENTOR.
STANLEY M. HOUSTON, JR.
BY
W. H. Maxwell
AGENT April 21, 1964 S. M. HOUSTON, JR 3,129,984
JOURNAL STOP AND ADAPTER THEREFOR
Filed June 16, 1961 2 Sheets-Sheet 2

INVENTOR.
STANLEY M. HOUSTON, JR.
BY
W. H. Maxwell
AGENT

United States Patent Office 3,129,984
Patented Apr. 21, 1964

3,129,984
JOURNAL STOP AND ADAPTER THEREFOR
Stanley M. Houston, Jr., Orinda, Calif., assignor to Do Company, a partnership composed of Stanley M. Houston, Jr., and Elon E. Packard, Oakland, Calif.
Filed June 16, 1961, Ser. No. 117,649
7 Claims. (Cl. 308—38)

This invention relates to journal boxes of railroad cars and is particularly concerned with lateral stops and the attachment thereof in position within the journal box for engagement with the journal, it being a general object of this invention to provide a journal stop that is readily installed and which operates reliably to receive loads and impacts that are imposed thereon during normal operation of the railroad car on which it is used.

This is a continuation in part application of my original application of the same title, Serial No. 56,866, filed September 19, 1960, now abandoned.

The design and construction of railroad trucks is highly developed and involves, generally, an axle and wheels built as units and installed in side frames, there being journal bearings on the axle and wheel units that engage in journal boxes on the side frames. The railroad trucks are usually supported by two or more axle wheel units and are characterized by side frames having a journal box at each wheel journal. The journals extend into the journal boxes to engage with the brasses or journal bearings and to engage with oil bearing waste or with suitable lubricators. The outer ends of the journal boxes are provided with dust guards surrounding the journal and carried in slots.

Lateral journal stops are installed in journal boxes and are ordinarily characterized by an elongate bar positioned alongside the journal that is to be stopped. The prior art stops operate for the purpose intended, to prevent displacement of the journal bearing in the journal box, but are difficult to install and are subject to imperfect positioning within the journal box. The journal boxes are castings that have inherently imperfect walls. Therefore, the stop in the form of a flat and/or straight bar cannot be reliably bolted into place, there being high and low spots on the walls of the journal box. Thus, the usual bolted-on journal stop is often deflected and bent out of shape and it is therefore subject to becoming loosened.

An object of this invention is to provide a journal bearing stop for use in railroad car journal boxes and wherein lateral thrust from the journal is evenly distributed into the said stop upon engagement therewith. The stops that I provide are tapered for proper distribution of stress when the journal box is turned relative to the journal, even though slight, and the mounting of the stop is straight and true regardless of the usual irregularities in the walls of the journal box.

Another object of this invention is to provide a journal bearing stop that can be simply hooked and then snapped into place to remain in working position. The stops that I provide include hooks that engage with an adapter and also include detent and/or lock means to prevent displacement from said working position.

It is still another object of this invention to provide a journal stop that is easily removed for replacement, with ordinary and conventional tools.

It is another object of this invention to provide a journal stop that does not hinder lubrication of the journal bearings of the structure involved, and a stop that is capable of withstanding substantial impact loads.

Figure 6:
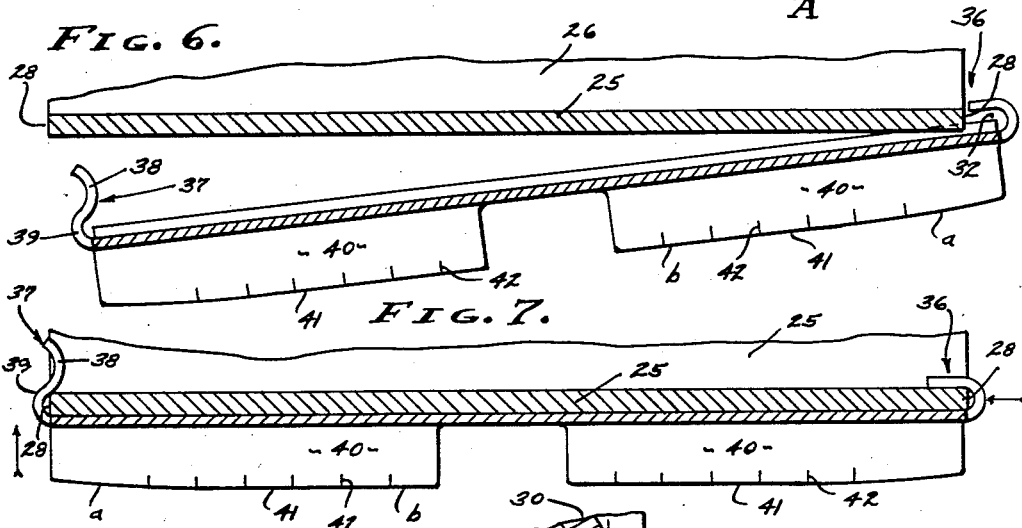
Figure 7:
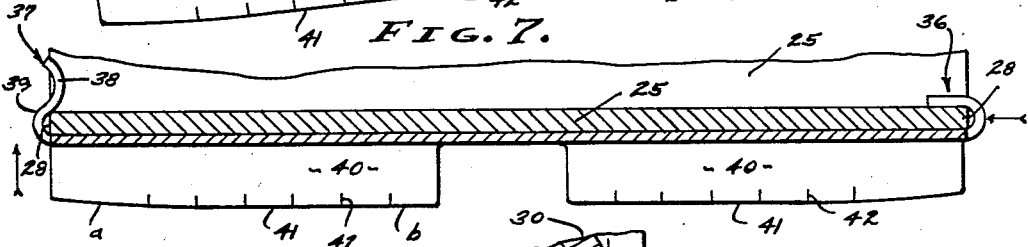
Figure 8:
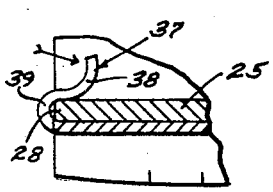
Figure 9:
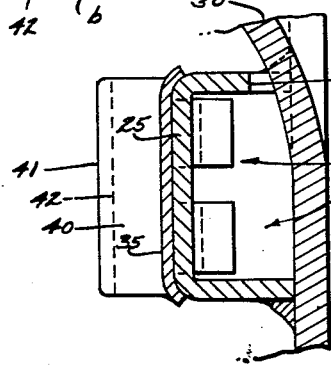

The various objects and features of my invention will be fully understood from the following detailed description of the typical preferred form and application of my invention, throughout which description reference is made to the accompanying drawings, in which:

FIG. 1 is a longitudinal sectional view taken through a typical railroad journal box and showing the position of the journal stops, in dotted lines. FIG. 2 is a transverse sectional view taken as indicated by line 2—2 on FIG. 1. FIGS. 3 and 4 are perspective views, FIG. 3 showing the adapter of the present invention and FIG. 4 showing the journal stop per se. FIG. 5 is a longitudinal plan section taken as indicated by line 5—5 on FIG. 1. FIG. 6 is an enlarged view of a portion of FIG. 5, showing the mode of insertion of the journal stop into the journal box. FIG. 7 is a view like FIG. 6 showing the hooked and snapped engagement of the journal stop on the adapter. FIG. 8 is a fragmentary view of a portion of FIG. 7 and showing the deformed detent means which serves to positively lock the journal stop in the working position. And, FIG. 9 is an enlarged detailed sectional view of a portion of the journal stop and adapter and taken as indicated by line 9—9 on FIG. 5.

The journal stop and adapter or bracket that I provide is primarily for use in railroad car journal boxes and in accordance with the usual railroad truck construction there is a journal box 10 carried at each end of the axle and wheel unit. The truck involves a central elongate axle with a pair of spaced wheels and a pair of trunnions or journals 11 that project from the ends of the axle outboard of the wheels. The axle is a straight shaft like part, the wheels being carried on the hubs or end portions thereof. A common journal construction is shown wherein there is a turned dust guard seat 12, the journal 13, and a journal collar 14. The seat 12, journal 13, and collar 14, are turned concentric with the axle, and seat 12 extends outwardly from the hub or wheel. The journal 13 is turned down to be of considerably smaller diameter than the seat 12 and extends outwardly from the seat and joins with the seat through a fillet 15. The fillet 15 is formed on a radius that is tangent to the surface of the journal 13 and substantially normal to the surface of the seat 12.

The journal collar 14 is carried at the terminal end of the journal 13 and projects radially to substantially the same diameter as the seat 12. The seat 12 is of sufficient axial extent to accommodate and engage with a dust guard, while the journal 13 is substantially elongate and characterized by a smooth cylindrical surface adapted to have engagement with the journal bearing or brass 16. Under operating conditions the journal 13 takes the radial thrust or supporting load while the fillet 15 and collar 14 take the axial thrust or side loads.

The journal box 10 is an elongate element that extends axially of the axle and rotatably receives the journal 13, and it involves generally a housing 20, a brass or journal bearing 16, a bearing wedge 17, and waste packing or a lubricator 18. The housing 20 has a top 21 that engages with the wedge 17 and it has sides 22 that depend from the top establishing a chamber for receiving the journal 13. The bottom of the housing 20 is closed by a sump or reservoir 23 for containing oil or lubricant. Thus, an elongate chamber is formed and is of a size such as to adequately accommodate the journal bearing and brass, etc.

In accordance with the present invention there are journal stops S placed laterally of the journal 13 and to be engaged thereby. As shown, the stops S are installed within the chamber in the housing 20, one at each sidewall 22 and one diametrically opposite the other. In practice, there are two stops S that have stop faces substantially tangential to the journal 13 and that are centered on a plane that extends horizontally through the center of the journal bearing axis. The stops S are carried and supported in working position by adapters A, said stops S and adapters A being alike, so that a description of one suffices for both installations thereof.

As is shown throughout the drawings, the bracket or adapter A is a fabricated part or element characterized by its inverted channel-shaped cross section having a flat elongate body 25 with depending legs 26 at each side of said body. The body 25 and legs 26 are integrally formed of a flat piece of sheet material, preferably steel, and of a substantial thickness so as to have adequate mechanical strength. The body 25 is rectangular in configuration with pairs of parallel sides and ends. The legs 26 continue from the body, as they are deflected or bent therefrom, and they are parallel legs terminating in straight coplanar bottom edges 27. As illustrated, the channel-shaped adapter A is open ended and simply cut off at a right angle to its elongation. The adapter A is symmetrical, in that it can be turned end for end, and it is characterized by straight normally disposed opposite end edges 28 at opposite ends of the body 25.

In carrying out the invention, the adapter A is permanently held in working position, as by welding W. Since the usual journal box housing 20 has a raised center portion at 30, that extends upwardly and inwardly from the sidewall 22 to position the journal bearing, there is a recess 31 provided at the center of the adapter A in order to freely pass said raised portion. Thus, the bottom edges 27 are adapted to engage with the inner face of the sidewall 22 of the housing when they are secured by the welding W. A feature of the present invention is the adaptability of the edges 27 to fit with the flat face of the wall 22.

In accordance with the invention, the journal stop S involves molded parts of specially compounded synthetic rubber having high stress and bearing characteristics, or it may be a material such as nylon, or other like plastic material or the stop S can be formed of metal, such as brass, when so desired. In its preferred form the stop S is characterized by its resilient abutments and by its ability to be hooked and/or snapped into place on the adapter A, and it is an elongate unit comprising a mounting plate 35 for flat seating engagement on the face of the straight body 25, and a pair of like oppositely disposed abutments 40. The stop S includes means to secure the same in working position, and in accordance with the invention this means involves a hook 36 at one end of the unit and a detent 37 at the other end of the unit. Further, said detent 37 is deformable, by suitable manipulation, so as to establish a positive lock for securement of the stop S in its installed working position (see FIG. 8).

The mounting plate 35 is a rigid part, preferably formed of sheet steel and of relatively thin section as shown, and it is formed so as to overlie the body 25. The channel-shaped adapter A, having said body 25, is preferably formed of relatively heavy sheet metal and, therefore, has convexly rounded corners at opposite parallel edges 34. In carrying out this invention, the opposite and parallel marginal portions 33 of the plate 35 are correspondingly concaved, all to the end that the plate 35 has coextensive keyed engagement with the adapter body 25.

The hook 36 that is provided at one end of the sheet metal mounting plate 35 is preferably an integral tongue-shaped extension of the plate. The hook 36, as formed by the extension at one end of the plate, is a part that is bent or deflected from the plane of the plate and with a portion turned back to underlie the end portion of the plate. As shown, the hook 36 presents a throat or opening 32 to receive the thickness of the material forming the body 25, whereby the edge 28 at one end of the body can enter the hook 36.

The detent 37 that is provided at the other end of the sheet metal mounting plate 35 is preferably an integral tongue-shaped extension of the plate. The detent 37, as formed by the extension at one end of the plate, is a part that is bent or deflected from the plane of the plate generally at about a right angle thereto, and in the same direction that the hook 36 is bent as above described. In order to have a snap action, the detent 37 is characterized by an inward projection 38 opposed to the other or hooked end of the plate 35. Said projection 38 is positioned from the plane of the plate in order to engage over the edge 28 and beneath the body 25 when the stop S is in working position as shown in FIGS. 5 and 7.

In accordance with the invention, the detent 37 is adapted to be deformed by further manipulation, to the condition illustrated in FIG. 8. The plate 35 is formed, as of sheet steel, having considerable resilience but not necessarily sufficient so as to assure complete elimination of movement between the plate 35 and the supporting adapter body 25. In fact, ordinary steel used, in practice, to form this part has a high degree of malleability and is readily adapted to be permanently deformed. With these factors in mind, and with reference to FIGS. 7 and 8, note that the detent 37 has a bent or deflected portion 39 that is arcuate and curves from the plane of the plate 35 and continues in the reversely curved projection 38. Thus, the detent is S-shaped as shown, and when it is snapped over the edge 28, as shown in FIG. 7, it can then be manipulated and bent into tightened engagement with the plate 25 as shown in FIG. 8. Said bending is readily accomplished with a tool such as a hammer or drift.

The stop S involves a pair of spaced abutments 40 arranged along the journal 13 to engage with the opposite end portions thereof, respectively. That is, one abutment 40 engages with the inner end portion of the journal 13, while the other abutment 40 engages with the outer end portion of the journal 13. The abutments 40 are molded of specially compounded material that is impregnated with a lubricant which is free to exude from the abutment. For example, a lubricant such as molybdenum disulfide, or a silicon or graphite compound, is mixed into and carried by the molded abutment 40. The said abutments 40 are spaced apart and project radially inward from the adapter A and terminate in vertically disposed stop faces 41 that are juxtapositioned to the peripheral surface of the journal 13, said plane being spaced somewhat approximately $\frac{3}{32}$ inch from the bearing surface. In accordance with the invention, the said lubricant is free to issue from the body of the material forming the abutment 40, this function being facilitated by provision of a plurality of transverse slits 42 cut into the face 41. The slits 42 are cut to a depth of about $\frac{1}{8}$ inch and each establishes an interstice that permits capillary action to draw lubricant from the abutment and to deliver it to face 41 and onto the journal 11.

It is a feature of this invention that lateral misalignment of the journal 13 is compensated for in the abutments 40, the stop faces 41 of the abutments being slightly inclined from the opposite ends of the stop S toward the center thereof. That is, each abutment 40 is wedge-shaped, with its outer end portion $a$ spaced farther from the journal 13 than the inner end portion $b$ (see FIGS. 4 and 5). The faces 41 may be straight flat surfaces, but it is preferred that they be convexly curved or arcuate (this condition being exaggerated in the drawings) and such that the inner portion b extends axially and tangent to a line that is parallel with the journal 13. Further, the outer end portion a is wider in vertical extent than the inner end portion b, by virtue of the rounded inner end configuration, as shown, in order to provide a stop face 41 that is coextensive with the normal area of wear due to misalignments of the journal 13.

From the foregoing, it will be apparent that the journal stop S and adapter A are but two simple easily constructed units, the stop S being formed of a pair of lubricated rubber parts vulcanized to the metal plate 35, and the adapter A being formed of a single body of metal. It is a simple matter to secure the adapters A in working position by simply welding them to the walls 22 with fillet welds W. In practice, the adapters A are assured of providing absolutely flat and parallel seats for the stops S.

With the adapter installed, as above described, the journal stops S are manually positioned and are locked into place as above described and without resort to added shims, cotter-keys and pins, etc. Also, removal is made easily by bending the detent element 38 back, with the aid of a packing hook, or like tool. With the stop S installed on the adapter A there is provided a light weight installation utilizing a minimum of materials. The legs 26 of the adapter are columns under compressive loads and they are mechanically sound. The stop bodies of rubber material are pliant and resilient and have a low modulus of elasticity so that they are not breakable and so that they depress upon impact of the journal 13 therewith. Therefore, assuming the journal to be in exact alignment, the two adjacent abutments are equally depressed, working outwardly from the center portions b thereof. The greater the impact the greater is the depression and area of stop to be engaged by the journal 13. Assuming that the journal 13 is laterally misaligned, then one or the other abutment 40 will take the major load, all or part of it, the inclined and curved face being adapted to meet the various increments of misalignment that may be involved during normal operation. When misalignment occurs in a transverse plane, then the widened outer end portions a provide a greater bearing area, all to the end that the bulk of the stops S is minimized and adequate stop faces 41 are maintained.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. In combination with a railroad car journal box housing having a vertically disposed side wall, a journal stop including, an elongate mounting plate, there being a pair of abutments of resilient bearing material inclined oppositely away from the center of the stop and secured to the said plate and each having a face juxtapositioned to the periphery of the journal operating within the housing and thereby to have progressively increased area of contact with the journal as the journal is pressed against said abutments.

2. In combination with a railroad car journal box housing having a vertically diposed side wall, an adapter including, an inverted channel-shaped support element fastened to said side wall and having a flat elongate body spaced from the side wall and extending along and parallel with the journal operating within the housing, and a journal stop including, a flat elongate mounting plate with one side to overlie and engage flat with the body of the adapter, an elongate body of resilient bearing material secured to the other side of the plate, said plate being secured to the adapter body by means of hooked engagement, said body of resilient material having a face juxtapositioned to the periphery of the journal operating within the housing.

3. In combination with a railroad car journal box housing having a vertically disposed side wall, an adapter including, an inverted channel-shaped support element fastened to said side wall and having a flat elongate body spaced therefrom and extending along and parallel with the journal operating within the housing, and a journal stop including, a flat elongate mounting plate with one side to overlie and engage flat with the body of the adapter, an elongate body of resilient bearing material secured to the other side of the plate, said plate being secured to the adapter body by engagement therewith of a hook projecting from the plate and by a detent positioning the plate, said body of resilient material having a face juxtapositioned to the periphery of the journal operating within the housing.

4. In combination with a railroad car journal box housing having a vertically disposed side wall, an adapter including, an inverted channel-shaped support element fastened to said side wall and having a flat elongate body spaced therefrom and extending along and parallel with the journal operating within the housing, and a journal stop including, a flat elongate mounting plate with one side to overlie and engage flat with the body of the adapter, an elongate body of resilient bearing material secured to the other side of the plate, said plate being secured to the adapter body by engagement therewith of a hook projecting from one end of the plate and by a detent projecting from the other end of the plate and positioning the plate, said body of resilient material having a face juxtapositioned to the periphery of the journal operating within the housing.

5. In combination with a railroad car journal box housing having a vertically disposed side wall, an adapter including, an inverted channel-shaped support element fastened to said side wall and having a flat elongate body spaced therefrom and extending along and parallel with the journal operating within the housing, and a journal stop including, a flat elongate mounting plate with one side to overlie and engage flat with the body of the adapter, an elongate body of resilient bearing material secured to the other side of the plate, said plate being secured to the adapter body by engagement therewith of a hook projecting from one end of the plate and by a detent projecting from the other end of the plate and deformable to lock the plate on the adapter body, said body of resilient material having a face juxtapositioned to the periphery of the journal operating within the housing.

6. In combination with a railroad car journal box housing having a vertically disposed side wall, an adapter including, an inverted channel-shaped support element fastened to said side wall and having a flat elongate body spaced therefrom and extending along and parallel with the journal operating within the housing, said body having convexed side edges, and a journal stop including, a flat elongate mounting plate with one side to overlie and engage flat with the body of the adapter and having concaved side edges to have keyed engagement with the convexed side edges of the adapter body, an elongate body of resilient bearing material secured to the side of the plate, said plate being secured to the adapter body by engagement therewith of a hook projecting from one end of the plate and by a detent projecting from the other end of the plate and deformable to lock the plate on the adapter body, said body of resilient material having a face juxtapositioned to the periphery of the journal operating within the housing.

7. In combination with a railroad car journal box housing having a central journal axis and a vertically disposed side wall, a journal stop including, an elongate body of resilient bearing material impregnated with lubricant, said body being secured to the said side wall and having a face juxtapositioned to and to engage the periphery of the journal operating with the housing, there being slits in the face of the impregnated body to free said lubricant when compressive force is applied thereto, said slits being disposed in planes radial to the journal axis.

References Cited in the file of this patent

UNITED STATES PATENTS

| | | |
|---|---|---|
| 527,043 | Beck | Oct. 9, 1894 |
| 626,070 | Mason | May 30, 1899 |
| 1,022,400 | Campbell | Apr. 9, 1912 |
| 2,006,657 | Smith | July 2, 1935 |
| 2,897,021 | Zeilman | July 28, 1959 |
| 2,913,285 | Einwaechter | Nov. 17, 1959 |
| 2,919,964 | Evans | Jan. 5, 1960 |
| 2,941,849 | Sale | June 21, 1960 |
| 3,027,203 | Sweger | Mar. 27, 1962 |

FOREIGN PATENTS

| | | |
|---|---|---|
| 107,213 | Austria | Sept. 10, 1927 |

OTHER REFERENCES

"Machine Design," published March 1954 (page 156 relied on).